United States Patent
Nistler et al.

(10) Patent No.: US 7,080,368 B2
(45) Date of Patent: Jul. 18, 2006

(54) OBJECT ORIENTED APPARATUS AND METHOD FOR PRESERVING STACK FRAME IDENTITY DURING INLINED METHOD CALLS

(75) Inventors: John Gerard Nistler, Rochester, MN (US); Mark Douglas Schroeder, Rochester, MN (US); Robert Carl Seemann, Zumbro Falls, MN (US)

(73) Assignee: International Business Machines Corporation, Armonk, NY (US)

( * ) Notice: Subject to any disclaimer, the term of this patent is extended or adjusted under 35 U.S.C. 154(b) by 618 days.

(21) Appl. No.: 10/285,255

(22) Filed: Oct. 31, 2002

(65) Prior Publication Data

US 2004/0088720 A1    May 6, 2004

(51) Int. Cl.
   *G06F 9/45* (2006.01)
   *G06F 3/00* (2006.01)
(52) U.S. Cl. .................. 717/153; 717/157; 717/165; 719/332
(58) Field of Classification Search ........ 717/136–166; 719/332
See application file for complete search history.

(56) References Cited

U.S. PATENT DOCUMENTS

| 6,101,326 A * | 8/2000 | Mattson, Jr. ............ 717/151 |
| 6,363,521 B1 * | 3/2002 | Yasue et al. ............ 717/128 |
| 6,507,946 B1 * | 1/2003 | Alexander et al. ........ 717/145 |

* cited by examiner

*Primary Examiner*—Tuan Dam
*Assistant Examiner*—Chuck Kendall
(74) *Attorney, Agent, or Firm*—Martin & Associates, LLC; Derek P. Martin (57) ABSTRACT

An object oriented mechanism and method provide exact information about the current invocation stack even when methods are inlined. A virtual stack frame mechanism determines whether a called method has been inlined, and counts both virtual frames and real frames when determining information corresponding to a called method. The virtual stack frame mechanism is preferably implemented in an object oriented class that provides methods for determining information corresponding to a called method.

13 Claims, 7 Drawing Sheets

```
public final class ExampleHelper
{
    private int j;      —— 310
    private int k;      ——312

// <init> method
    public ExampleHelper()   ——320
    {
        j = k = 0;      ——322
    } public void m1()    ——330
    {
        j = 1;          ——332
        m2();           ——334
        k = 1;          ——336
    } public void m2()    ——340
    {
        j = 2;          ——342
        m3();           ——344
        k = 2;          ——346
    } public void m3()    ——350                                   352
    {
        Class cls = sun.reflect.Reflection.getCallerClass(3);
        System.out.println("Caller = " + cls.getName());
    }                                                            354
}
```

FIG. 3

```
public final class Example
{
        public static int y;     ——410
        public static int z;     ——420 public static void main(String[] args) ——430      440
        {                                                  )
                ExampleHelper helper = new ExampleHelper();
                y = 1;          ——450
                helper.m1();    ——460
                z = 1;          ——470
        }
}
```

| Class | Methods |
|---|---|
| JavaVirtualFrame | JavaVirtualFrame()<br>getPreviousJavaFrameMethod()<br>getMethodInfo()<br>getExecutingClass()<br>getRealFrame()<br>getClassForCurrentMethod()<br>getClassForCallerOfCurrentMethod()<br>getNearestClassWithLoader()<br>getClassContext()<br>getMethodNameList()<br>getMethodSignatureList()<br>getClassForJavaFrame()<br>findJavaFrame() |

OBJECT ORIENTED APPARATUS AND METHOD FOR PRESERVING STACK FRAME IDENTITY DURING INLINED METHOD CALLS

BACKGROUND OF THE INVENTION

1. Technical Field

This invention generally relates to computer systems. More specifically, this invention relates to identifying stack frames corresponding to called methods in object oriented systems.

2. Background Art

Since the dawn of the computer age, computer systems have evolved into extremely sophisticated devices, and computer systems may be found in many different settings. Computer systems typically include a combination of hardware, such as semiconductors and circuit boards, and software, also known as computer programs. As advances in semiconductor processing and computer architecture push the performance of the computer hardware higher, more sophisticated computer software has evolved to take advantage of the higher performance of the hardware, resulting in computer systems today that are much more powerful than just a few years ago.

Computer systems typically include operating system software that controls the basic function of the computer, and one or more software application programs that run under the control of the operating system to perform desired tasks. For example, a typical IBM Personal Computer may run a Microsoft Windows operating system, and under the control of the operating system, a user may execute an application program, such as a word processor. As the capabilities of computer systems have increased, the application software programs designed for high performance computer systems have become extremely powerful. Additionally, software development costs have continued to rise because more powerful and complex programs take more time, and hence more money, to produce.

One way in which the performance of application software programs has been improved while the associated development costs have been reduced is by using object oriented programming concepts. The goal of using object oriented programming is to create small, reusable sections of program code known as "objects" that can be quickly and easily combined and re-used to create new programs. This is similar to the idea of using the same set of building blocks again and again to create many different structures. The modular and re-usable aspects of objects will typically speed development of new programs, thereby reducing the costs associated with the development cycle. In addition, by creating and re-using a comprehensive set of well-tested objects, a more stable, uniform, and consistent approach to developing new computer programs can be achieved.

The Java programming language developed by Sun Microsystems is one modern object oriented programming language that has become very popular in recent years. Java creates one or more invocation stacks at run-time that are used to store information when a method is called (or invoked). When a method is invoked, a new stack frame is typically allocated that contains information for the called method. Java includes several classes that contain methods which require exact information to be gathered about the current invocation stack.

One thing that can complicate or even preclude the gathering of exact information about the current invocation stack is the inlining of methods. In some circumstances code can be optimized by incorporating (or inlining) code from one method into another method. By inlining a method into another method, only one invocation stack frame exists where there would normally be two, one of each method. As a result, inlining has been generally viewed as being incompatible with gathering exact information about the current invocation stack. To be fully compatible with Java, the capability of gathering exact information about the current invocation stack is an absolute necessity. As a result, computer system manufacturers are faced with the dilemma of either enabling inlining to optimize code at the expense of full compatibility with Java, or disabling inlining to assure full compatibility with Java. Without a way to provide exact invocation stack information when one of more stack frames include inlined methods, the computer industry will continue to suffer from Java-compliant code that cannot benefit from inlining of methods, or non-compliant code that benefits from the inlining of methods.

DISCLOSURE OF INVENTION

According to the preferred embodiments, an object oriented mechanism and method provide exact information about the current invocation stack even when methods are inlined. A virtual stack frame mechanism determines whether a called method has been inlined, and counts both virtual frames and real frames when determining information corresponding to a called method. The virtual stack frame mechanism is preferably implemented in an object oriented class that provides methods for determining information corresponding to a called method.

BRIEF DESCRIPTION OF DRAWINGS

The preferred exemplary embodiments of the present invention will hereinafter be described in conjunction with the appended drawings, where like designations denote like elements, and.

BEST MODE FOR CARRYING OUT THE INVENTION

The present invention relates to the execution of object oriented programs. For those individuals who are not generally familiar with object oriented programs, the Overview section below presents many of the concepts that will help to understand the invention.

OVERVIEW

Object Oriented Technology v. Procedural Technology

Object oriented programming is a method of implementation in which programs are organized as cooperative collections of objects, each of which represents an instance of some class, and whose classes are all members of a hierarchy of classes united via inheritance relationships. Object oriented programming differs from standard procedural programming in that it uses objects, not algorithms, as the fundamental building blocks for creating computer programs. This difference stems from the fact that the design focus of object oriented programming technology is wholly different than that of procedural programming technology.

The focus of procedural-based design is on the overall process that solves the problem; whereas, the focus of object oriented design is on how the problem can be broken down into a set of autonomous entities that can work together to provide a solution. The autonomous entities of object oriented technology are, of course, objects. Said another way, object oriented technology is significantly different from procedural technology because problems are broken down into sets of cooperating objects instead of into hierarchies of nested computer programs or procedures.

Thus, a pure object oriented program is made up of code entities called objects. Each object is an identifiable, encapsulated piece of code that provides one or more object interface and internal object data. In particular, all data is encapsulated by the object interface such that other objects must communicate with that object through its object interface. The only way to retrieve, process or otherwise operate on the encapsulated data is through the methods defined on the object. This protects the internal data portion of the object from outside tampering. Additionally, because outside objects have no access to the internal implementation of an object, that internal implementation can change without affecting other aspects of the program.

In this way, the object system isolates the requestor of services (client objects) from the providers of services (server objects) by a well defined encapsulating interface. Thus, in the classic object model, a client object sends request messages (e.g., method calls) to server objects to perform any necessary or desired function. The message identifies a particular server object and specifies what method is to be performed by the server object, and also supplies any required parameters. The server object receives and interprets the message, and can then determine what service to perform.

A central concept in object oriented programming is the class. A class is a template that defines a type of object. A class outlines the makeup of objects that belong to that class. By defining a class, objects can be created that belong to the class without having to rewrite the entire definition for each new object as it is created. This feature of object oriented programming promotes the reusability of existing definitions and promotes efficient use of program code.

There are many computer languages that presently support object oriented programming techniques. For example, Smalltalk, Object Pascal, C++ and Java are all examples of programming languages that support object oriented programming to one degree of another.

Java Programming Language

Java is a modern object oriented programming language designed by Sun Microsystems that has grown in popularity in recent years. Java offers many features and advantages that makes it a desirable programming language to use. First, Java is specifically designed to create small application programs, commonly called "applets," that can reside on the network in centralized servers, and which are delivered to the client machine only when needed. Second, Java is completely platform independent. A Java program can be written once and can then run on any type of platform that contains a Java Virtual Machine (JVM). The JVM model is supported by most computer vendors, thereby allowing a software vendor to have access to hardware, and software systems produced by many different companies. Finally, Java is an object oriented language, meaning that software written in Java can take advantage of the benefits of object oriented programming techniques.

As in other objects oriented systems, operations in Java are performed by one object calling a method on another object. These objects can reside locally on the same machine or on separate JVM's physically located on separate computers or systems.

Invocation Stacks in Java

Figure 2A:
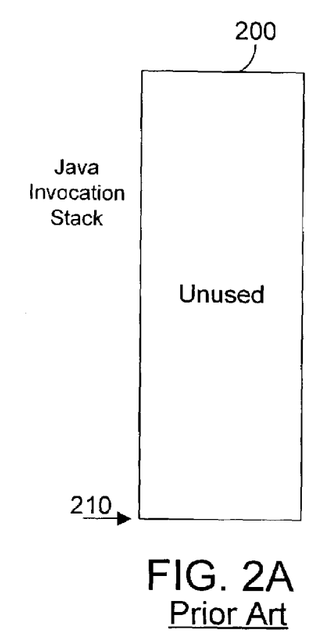
FIGS. 2A–2F are each block diagram representations of a prior art invocation stack in various states.
Figure 2B:
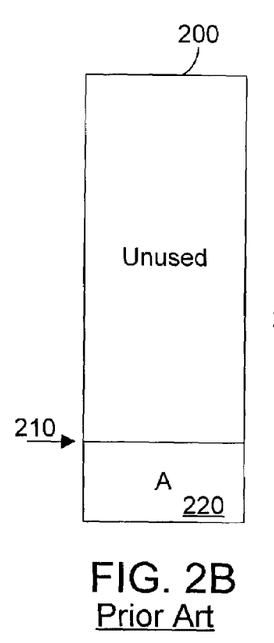

The Java programming language defines one or more invocation stacks that are used to store information when a method is called (or invoked). FIG. 2 shows various views of an invocation stack 200 in different states. Referring to FIG. 2A, invocation stack 200 is shown before any methods are invoked, with its stack pointer 210 at the bottom of the stack. Entries are stored on the stack bottom up. Note that the stack pointer could equally be at the top of the stack, with the entries stored on the stack top down. FIG. 2B illustrates what happens when method A is invoked. An invocation stack frame 220 for A is pushed on the stack, and the stack pointer 210 is then moved to the next available location on the stack.

An invocation stack frame can contain many different types of data. For example, an invocation stack frame can contain the stored state of all processor registers when the method was invoked, so that some or all of these values can be restored when the method has completed. An invocation stack frame can also contain storage for any variables that are local to the method. Thus, if an integer m is declared as a local variable, the invocation stack frame would contain the memory allocation for m. A stack frame may also contain any amount of information describing the state of the machine and/or the state of the executing program that existed at the time the method was called. A stack frame within the scope of the preferred embodiments can include any and all data that corresponds to a called method.

Figure 2C:
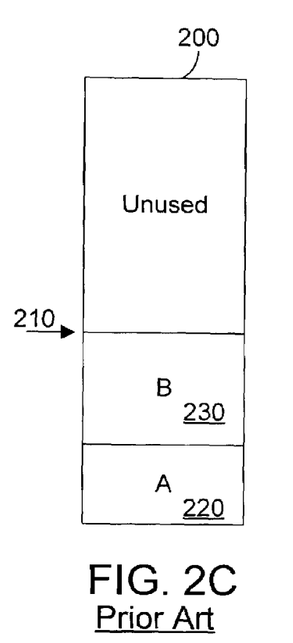
Figure 2D:
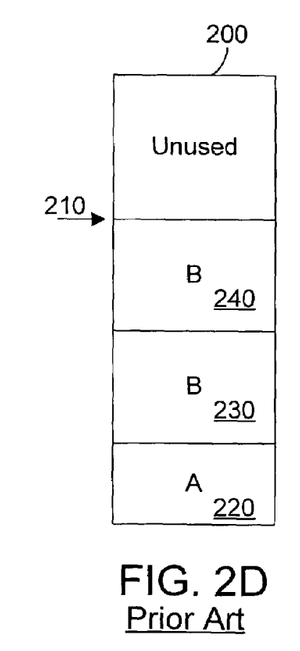
Figure 2E:
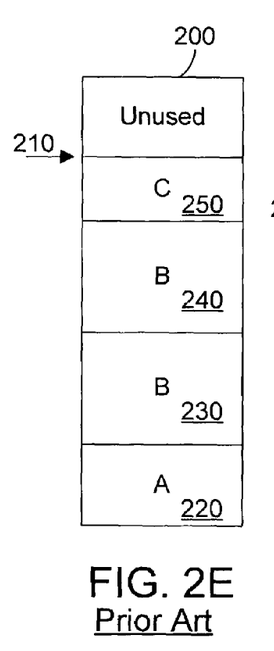
Figure 2F:
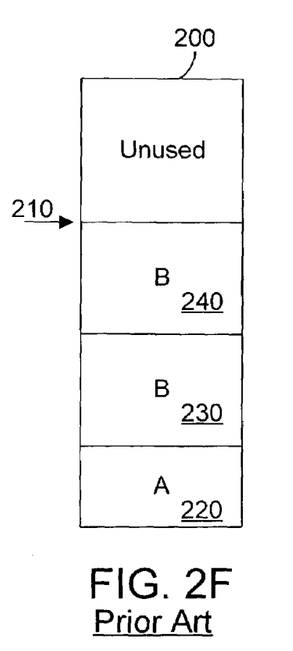

Referring to FIG. 2C, we assume that in the execution of method A, method B is invoked, so that stack frame 230 for method B is pushed on the invocation stack 200, and the stack pointer 210 is moved to the next available location. We assume that method B calls itself, which causes another instance 240 of a stack frame for method B to be stored on the invocation stack 200, with the stack pointer 210 moved to the next available location, as shown in FIG. 2D. We assume that the second invocation of method B then calls method C, so that stack frame 250 for method C is then pushed onto the invocation stack and stack pointer 210 is moved to the next available location, as shown in FIG. 2E. At this point we assume that method C does not call any other methods, and runs to completion. This causes the stack pointer 210 to move down to the beginning of the stack frame for method C, effectively reclaiming the area of the invocation stack 200 that was used for stack frame 250, as shown in FIG. 2F.

DETAILED DESCRIPTION

An apparatus and method in accordance with the preferred embodiments allow returning exact invocation stack frame information even when methods are inlined and thus do not appear on the invocation stack. In this manner, a computer program can benefit from inlining while also remaining compliant with requirements to accurately return stack frame information.

Figure 1:
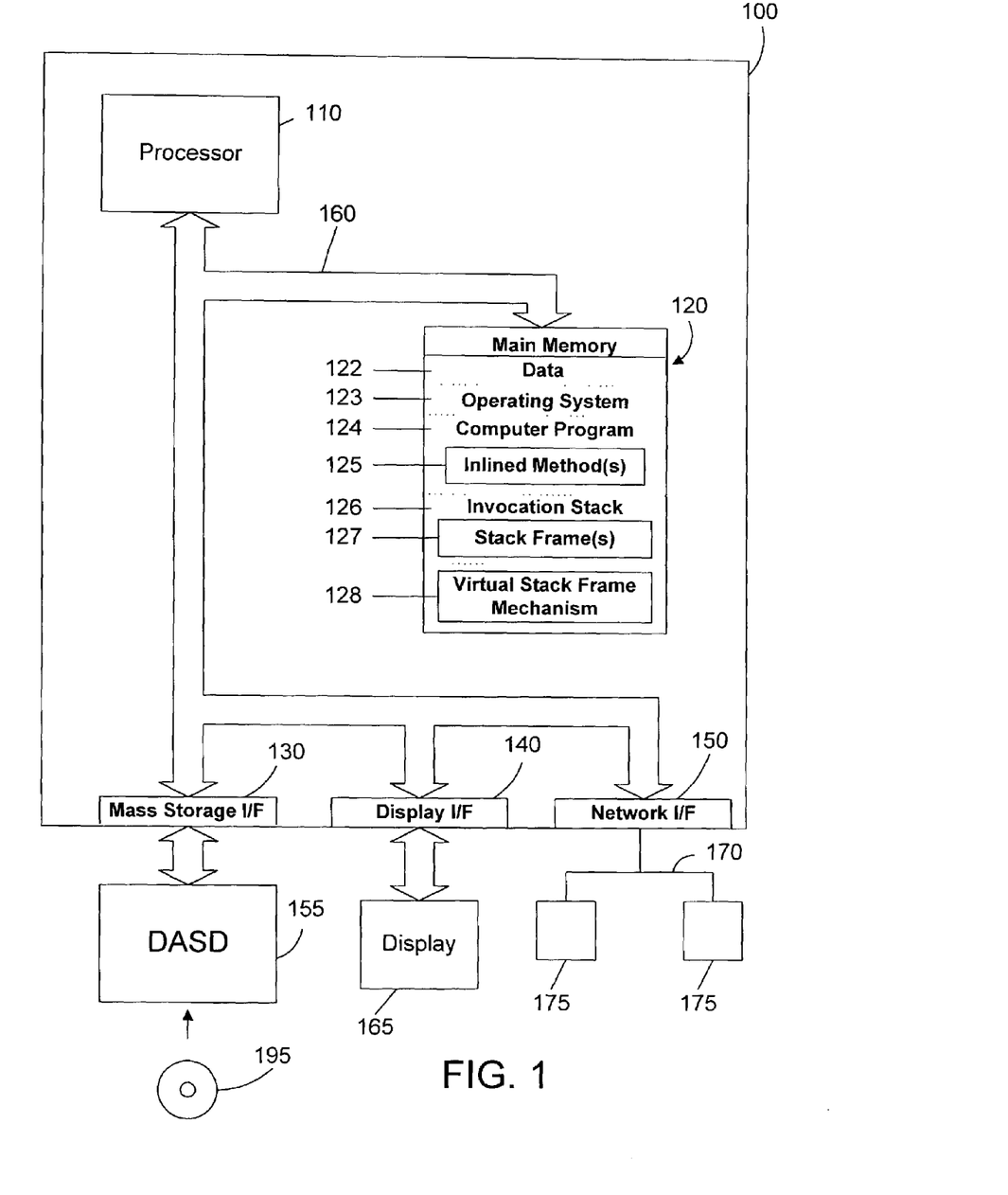
FIG. 1 is a block diagram of an apparatus in accordance with the preferred embodiments.

Referring now to FIG. 1, a computer system 100 is one suitable implementation of an apparatus in accordance with the preferred embodiments of the invention. Computer system 100 is an IBM iSeries computer system. However, those skilled in the art will appreciate that the mechanisms and apparatus of the present invention apply equally to any computer system, regardless of whether the computer system is a complicated multi-user computing apparatus, a single user workstation, or an embedded control system. As shown in FIG. 1, computer system 100 comprises a processor 110, a main memory 120, a mass storage interface 130, a display interface 140, and a network interface 150. These system components are interconnected through the use of a system bus 160. Mass storage interface 130 is used to connect mass storage devices (such as a direct access storage device 155) to computer system 100. One specific type of direct access storage device 155 is a readable and writable CD-RW drive, which may store data to and read data from a CD-RW 195.

Main memory 120 in accordance with the preferred embodiments contains data 122, an operating system 123, a computer program 124, an invocation stack 126, and a virtual stack frame mechanism 128. Computer program 124 preferably includes one or more inlined methods 125. Invocation stack 126 preferably includes one or more stack frames 127. Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 122, operating system 123, computer programs 124, and invocation stack 126 are shown to reside in main memory 120, those skilled in the art will recognize that these items are not necessarily all completely contained in main memory 120 at the same time. It should also be noted that the term "memory" is used herein to generically refer to the entire virtual memory of computer system 100, and may include the virtual memory of other computer systems coupled to computer system 100.

Data 122 represents any data that serves as input to or output from any program in computer system 100. Operating system 123 is a multitasking operating system known in the industry as OS/400; however, those skilled in the art will appreciate that the spirit and scope of the present invention is not limited to any one operating system. Computer program 124 is a computer program that is executed by processor 110. Computer program 124 is preferably a computer program written in an object oriented language. Invocation stack 126 is a run-time data structure that is used to store information relating to methods called in the computer program 124. Invocation stack 126 is preferably comprised of a plurality of stack frames 127, as is known in the art.

Virtual stack frame mechanism 128 is preferably an object oriented mechanism that returns correct stack frame information corresponding to a called method even when one or more inlined methods 125 are present in the computer program 124. Virtual stack frame mechanism 128 thus distinguishes between real stack frames 127 on the invocation stack and virtual stack frames that result from the inlining of method(s). Virtual stack frame mechanism 128 thus assures that correct stack frame information will always be returned, even in the presence of inlined methods. In this manner, virtual stack frame mechanism 128 provides a solution that is fully compliant while still benefitting from inlining of methods.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 123. Operating system 123 is a sophisticated program that manages the resources of computer system 100. Some of these resources are processor 110, main memory 120, mass storage interface 130, display interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks and CD-RW (e.g., 195 of FIG. 1), and transmission type media such as digital and analog communications links.

Figure 3:
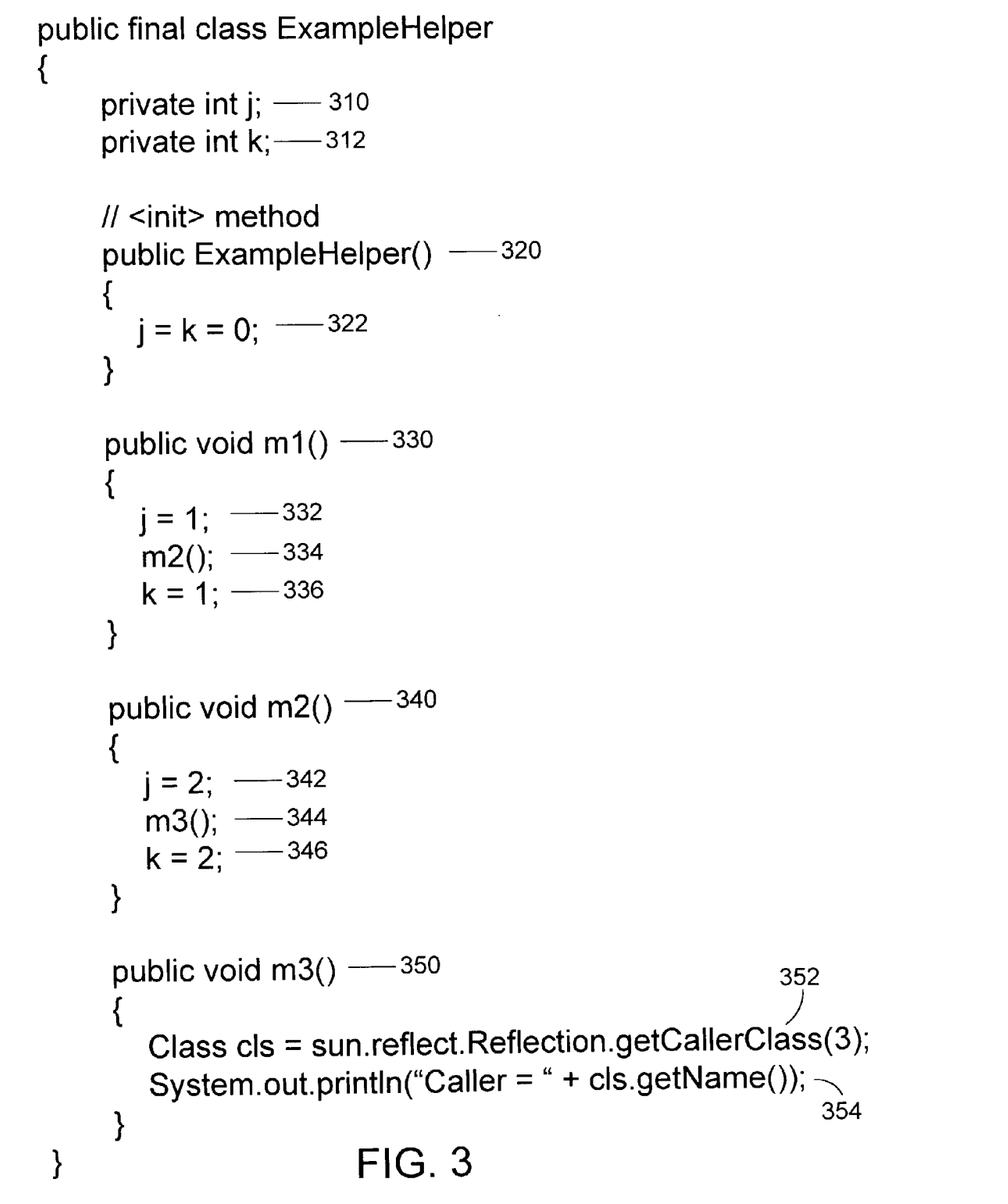
FIG. 3 is a diagram of Java pseudo-code used to illustrate the preferred embodiments.
Figure 4:
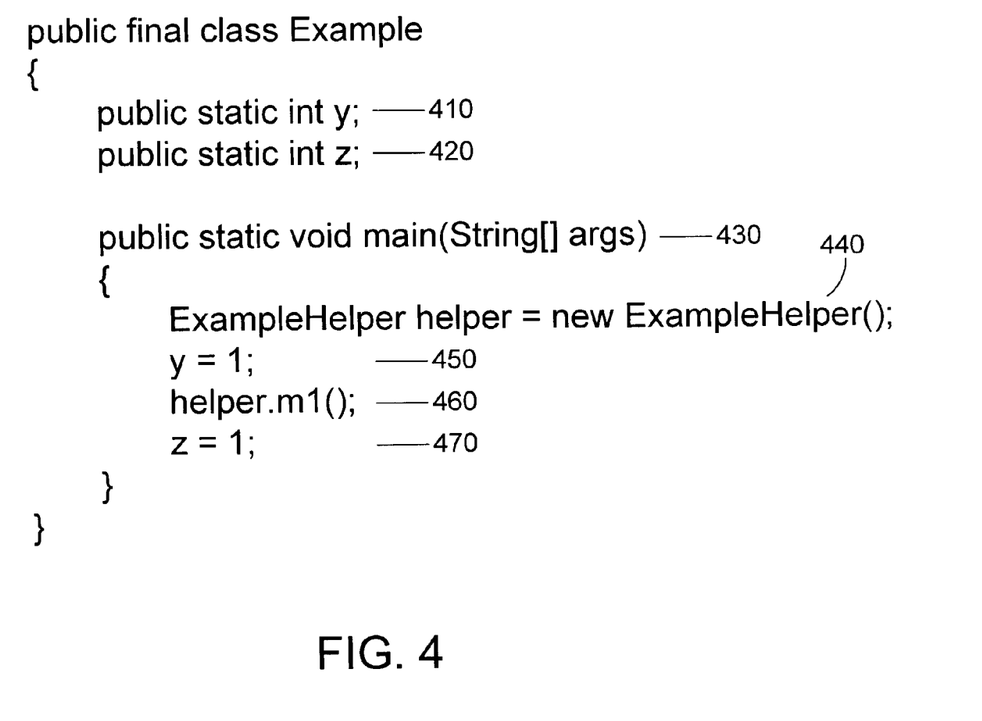
FIG. 4 is a diagram of Java pseudo-code used to illustrate the preferred embodiments.

An example is now presented to illustrate the concepts of the preferred embodiments. FIG. 4 shows sample code that defines a class Example whose main() method invokes the ExampleHelper() class shown in FIG. 3. Two variables y and z are defined at lines 410 and 420. The main() method in FIG. 4 is shown at line 430, which creates an instance of ExampleHelper at line 440, sets variable y to a value of 1 at line 450, invokes method m1() on the ExampleHelper instance at line 460, and sets variable z to a value of 1 at line 470. The ExampleHelper class is shown in FIG. 3, which defines two variables j and k at lines 310 and 312, and which defines initialization code at lines 320 and 322 that is executed when an instance of ExampleHelper is created. ExampleHelper further defines three methods, m1() at line 330, m2() at line 340, and m3() at line 350. Method m1() has three instructions shown at lines 332, 334 and 336. Note that the instruction at line 334 invokes method m2(). Method m2() has three instructions shown at lines 342, 344 and 346. Note that the instruction at line 344 invokes method m3(). Method m3() has two instructions shown at lines 352 and 354. The instructions at line 352 calls a method getCallerClass() on a class provided in the Sun Java application programming interface (API). The getCallerClass() method preferably calls to native code that invokes the virtual stack frame mechanism 128 shown in FIG. 1. The numerical parameter passed when the getCallerClass() method is called (i.e., the number 3 in the example of FIG. 3), tells the getCallerClass() method how many frames back in the invocation stack to skip.

Figure 5:
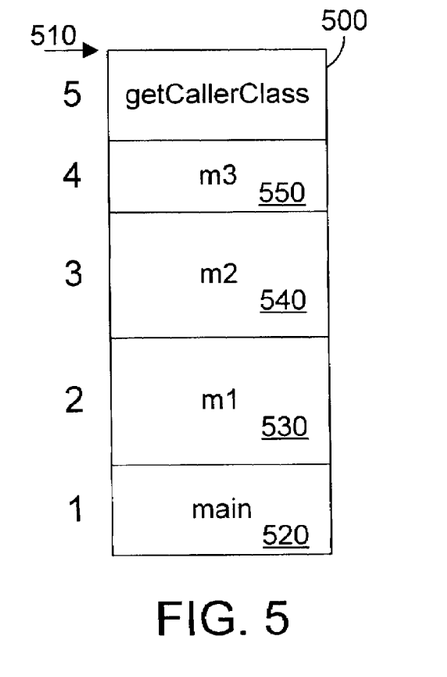
FIG. 5 is a block diagram of an invocation stack for the pseudo-code in FIGS. 3 and 4 when no inlining of methods is performed.

FIG. 5 shows an invocation stack 500 for the sample code in FIGS. 3 and 4 when the getCallerClass() method is invoked, assuming that none of the methods in FIGS. 3 and 4 are inlined. With the stack pointer 510 in the position shown in FIG. 5, invoking getCallerClass(0) returns the class for the method in stack frame 5, namely ExampleHelper. Similarly, invoking getCallerClass(1) returns the class for the method in stack frame 4, namely ExampleHelper; getCallerClass(2) returns the class for the method in stack frame 3, namely ExampleHelper; getCallClass(3) returns the class for the method in stack frame 2, namely ExampleHelper; and getCallerClass(4) returns the class for the method in stack frame 1, namely Example.

Figure 6:
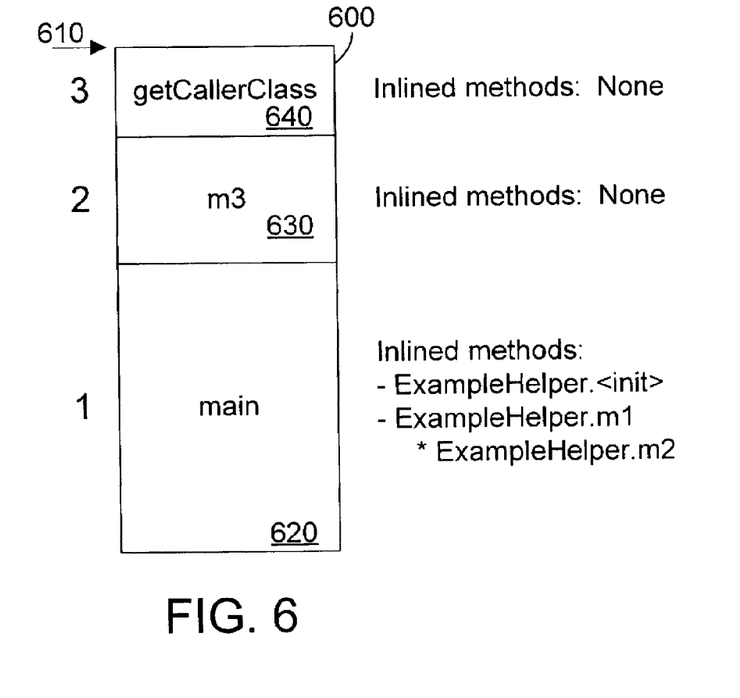
FIG. 6 is a block diagram of an invocation stack for the pseudo-code in FIGS. 3 and 4 when inlining of methods is performed.

Now we consider the case of inlined methods. FIG. 6 shows an invocation stack 600 for a method main() that includes inlined methods. We assume for this example that the following methods have been inlined into the main() method in the Example class: the <init> method 320 on the ExampleHelper class, and methods m1() 330 and m2() 340 in the ExampleHelper class. The inlining of these methods is shown in detail in block 620 FIG. 7, which shows what the generated code looks like after inlining. Note that code block 620 is one simple example of a portion of a computer program 124 that contains inlined methods 125 (see FIG. 1). In the inlined version of code shown in FIG. 7, a new instance of the ExampleHelper class is created at 710, but the initialization of variables j and k to zero at line 322 is inlined at 720. The instruction y=1 at line 730 corresponds to the same instruction at line 450 in FIG. 4. The call to m1() at line 460 is then inlined, as shown at 740, 750 and 760 of FIG. 7. Note that m1() calls m2(), which is also inlined at 750. Finally, the instruction at line 470 of FIG. 4 is executed at 770.

Figure 7:
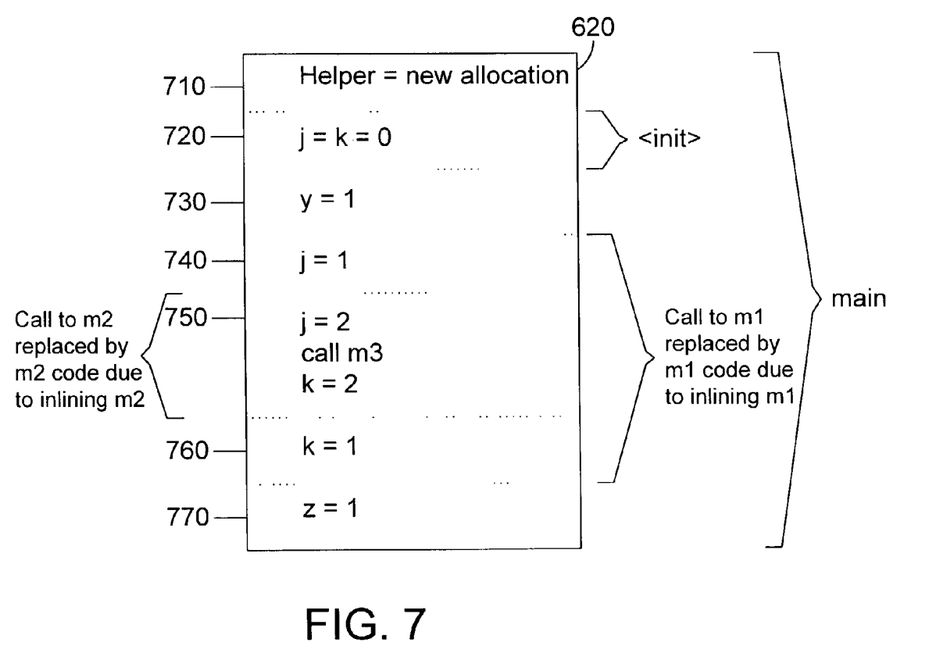
FIG. 7 is an enlarged view showing the code in the main method in stack frame 620 of FIG. 6.

Executing the version of main() that contains inlined methods <init>, m1() and m2() as shown in FIG. 7 results in the invocation stack 600 shown in FIG. 6. Note that there are only three stack frames in FIG. 6, while there are five stack frames in FIG. 5. We see from this simple example that inlining has changed the number of real stack frames. As a result, there is no longer a one-to-one correspondence between methods and stack frames. If the prior art invoked getCallerClass(2) with the stack of FIG. 5, the class of the method in stack frame 3 would be returned, namely ExampleHelper. If the prior art invoked getCallerClass(2) with the stack of FIG. 6, however, the class of the method in stack frame 1 would be returned, namely Example. The inlining of methods in FIGS. 6 and 7 has therefore created a problem with prior art methods for determining stack frame information FIGS. 5–7 graphically illustrate the problem encountered in the prior art when methods are inlined in an object oriented program.

Java includes native methods, such as getCallerClass(), that are used to assure the currently-executing Java code is not allowed to access system resources it does not have permission to access. For this reason, achieving full compatibility with Java requires that correct stack frame information always be returned. Because inlining can result in incorrect stack frame information, some prior art systems require inlining to be turned off in some cases in order to achieve full Java compatibility. The result is that the maximum benefits of inlining are not available in a fully Java-compliant system in the prior art. The preferred embodiments overcome this overcome this obstacle by differentiating between real Java stack frames, and "virtual" stack frames that relate to an inlined method, and by counting both when traversing the invocation stack.

In the preferred embodiments, the virtual stack frame mechanism 128 in FIG. 1 counts real Java stack frames, and also determines when a method has been inlined, thus allowing a determination of virtual stack frames. Thus, when getCallerClass(3) is invoked for the invocation stack 600 that includes inlined methods, the getCallerClass() method invokes the virtual stack frame mechanism 128, passing the number 3 as a parameter. This tells the virtual stack frame mechanism 128 to return the class of the stack frame after skipping three stack frames. This is done by traversing the stack unit it finds the first stack frame that was stacked by a Java program (or until there are no frames left in the stack). Once the first Java stack frame is located, data structures are initialized about the inline depth at the frame's suspend point, and the method that caused the current real stack frame to be created on the stack. Once this information is initialized, the number of specified frames are skipped, whether the frames be real stack frames or virtual stack frames.

For the specific example in FIGS. 3, 4, 6 and 7, the method main() is invoked in the Example class. This method creates a new ExampleHelper object. The m1() method is invoked on the ExampleHelper object. The m1() method invokes m2(), which in turn invokes m3(). Method m3() invokes the sun.reflect.Reflection.getCallerClass(3) method. This method calls to Java native code, which invokes the virtual stack frame mechanism 128 to find the class of the caller, skipping past the first three frames it encounters. The invocation stack 600 is traversed until stack frame 3 is located. Stack frame 3 is the last stack frame that was stacked by a Java program. Information about the inline depth at the suspend point for stack frame 3 is retrieved. The inline depth for stack frame 3 is zero, because there are no inlined methods at the suspend point. Because the inline depth for stack frame 3 is zero, we skip over real stack frame 3 and search for the next real stack frame stacked by a Java program, which is stack frame 2. Information about the inline depth at the suspend point for stack frame 2 is retrieved. The inline depth for stack frame 2 is zero, because there are no inlined methods at the suspend point. Because the inline depth for stack frame 2 is zero, we skip over real stack frame 2 and search for the next real stack frame stacked by a Java program, which is stack frame 1. Information about the inline depth at the suspend point for stack frame 1 is retrieved. In this example, the inline depth is two, one for the inlined method m1(), and one for the method 2(), which is called from m1() as was also inlined into main(). This means that at this particular suspend point, there are two virtual stack frames as well as the real stack frame. The one real stack frame 1 thus corresponds to three method invocations, two of which were inlined. The virtual stack frame mechanism 128 "traverses" stack frame 1 by returning first the data of the deepest method, namely m2(), then returning the data of the next deepest method, namely m1(), then returning the data for the real stack frame 1. In this example, the virtual stack frame mechanism 128 has already skipped two frames, so it skips one more stack frame, the virtual stack frame for method m2(). The virtual stack frame mechanism 128 has thus skipped three frames, as requested by getCallerClass(3), so the virtual stack frame mechanism 128 returns the class of the current method m1(), namely Example.

We see from this simple example that the virtual stack frame mechanism 128 accounts for inlining by treating inlined methods as having virtual stack frames. As a result, the same stack frame information is returned when getCallerClass(3) is involved whether or not inlining of methods has occurred. Thus we see from the invocation stack 500 in FIG. 5 that getCallerClass(3) skips the first three stack frames (5, 4 and 3), and returns the class of the method in stack frame 2, namely Example. Note that calling getCallClass(3) on the stack frame 600 of FIG. 6 using the prior art methods would result in an error, because after skipping three actual stack frames (3, 2 and 1), there are no more stack frames left. However, calling getCallerClass(3) on the stack frame 600 of FIG. 6 using the virtual stack frame mechanism 128 herein results in returning the class of method m1(), namely Example. The preferred embodiments thus provide accurate stack frame information even when one or more methods have been inlined into one or more stack frames.

Figure 8:
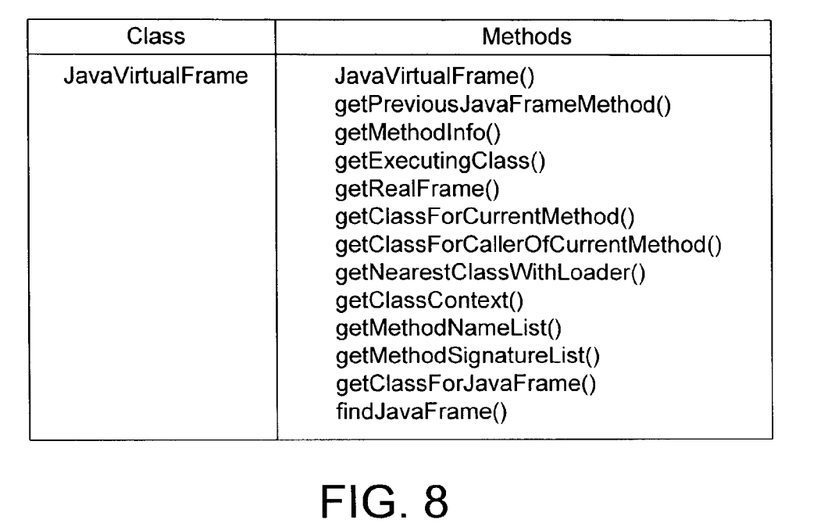
FIG. 8 is a table showing suitable methods on a JavaVirtualFrame class that is one suitable implementation of the virtual stack frame mechanism 128 in FIG. 1.

In the preferred embodiments, the virtual stack frame mechanism 128 is implemented in an object oriented class that we denote herein JavaVirtualFrame. Referring to FIG. 8, the JavaVirtualFrame class defines a number of different methods that allow the JavaVirtualFrame class to count both virtual stack frames and real stack frames when traversing an invocation stack. The JavaVirtualFrame() method is invoked by the sun.reflect.Reflection.getCallerClass() method, and the numerical parameter passed to the getCallerClass() method that represents the number of stack frames to skip is also passed to the JavaVirtualFrame() method. The JavaVirtualFrame class defines variables JavaVirtualFrame, JavaRealFrame, virtualFrameMethod, and method_info. The getPreviouslyJavaFrameMethod() method is used to set the state of the JavaVirtualFrame to the previous Java method invocation. It is invoked to move to the next stack frame in the invocation stack. This method is sensitive to methods that may have been inlined within the same JavaRealFrame. So calling this method would set the internal virtualFrameMethod to the previous method_info, but it may be within the same JavaRealFrame. The method_info returned is the internal. virtualFrameMethod.method_info.

The getMethodInfo() method retrieves method info for a JavaVirtualFrame or a JavaRealFrame. The getExecutingClass() method returns the class for the current virtualFrameMethod. The getRealFrame() method returns the current Java real stack frame, but this method must be used carefully because there may be several JavaVirtualFrames associated with the same JavaRealFrame when methods have been inlined.

The following methods shown in FIG. 8 are preferably static methods that are provided to encapsulate internal stack operations and provide a specific function on behalf of the client. The getClassForCurrnetMethod() class returns the class corresponding to the last (most recent) Java method found on the stack. The getClassForCallerOfCurrentMethod() class returns the class for the second to last Java method found on the stack. The getNearestClassWithLoader() methods finds the last (most recent) classloader on the stack and returns its class. The getClassContext() method returns an array of runtime class objects found on the stack as an array of Java objects. The getMethodNameList() method returns an array of method names found on the stack as an array of Java objects. The getClassForJavaFrame() method returns the class for the nth Java method found on the stack, where n represents a parameter passed when the method is called. When n=0, the current method's class is returned; when n=1, the class of the caller of the current method is returned, and so on.

The findJavaFrame() method is a private method that should not be exposed to clients. It determines if the input JavaRealFrame has a Java program. If it does, this method updates the JavaVirtualFrame's data members for the current real stack frame. If the current real stack frame does not have a Java program, it looks in the previous frames until one is found, or there are no more frames.

Many different functions can be performed using the methods shown in FIG. 8. An example of how client code may use JavVirtualFrame follows. The client code first invokes the JavaVirtualFrame constructor. The JavaVirtualFrame constructor invokes the findJavaFrame() method, which iterates through the stack until it finds the first stack frame created by a Java program. It then initializes the JavaVirtualFrame object's internal data members based on the stack frame it found. The client code can continue to traverse through stack frames, both virtual and real, until the requested number of stack frames have been skipped. When moving from the current stack frame to the previous stack frame, the getPreviousJavaFrameMethod() method is invoked. Once the specified number of stack frames have been skipped, the client code can extract whatever information it needs from the current stack frame, whether it be a real stack frame or a virtual stack frame.

Figure 9:
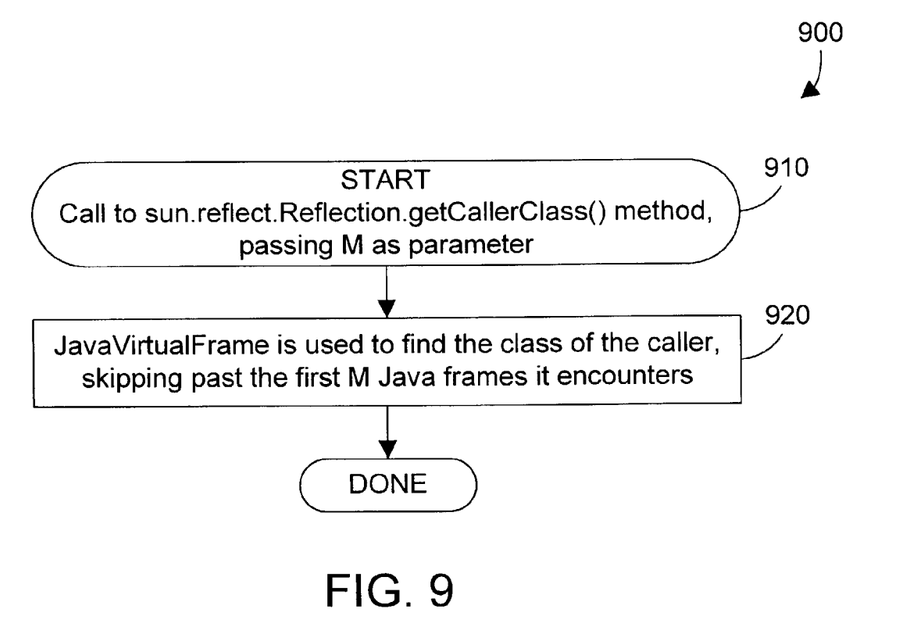
FIG. 9 is a flow diagram of a method in accordance with the preferred embodiments.

Referring now to FIG. 9, a method 900 in accordance with the preferred embodiments begins with a call to the sun.reflect.Reflection.getCallerClass() method, passing M as a parameter (step 910). In response, JavaVirtualFrame is used to find the class of the caller, skipping past the first M Java frames it encounters (step 920), whether those frames are real frames or virtual frames. Method 900 graphically represents one of the significant advantages of the preferred embodiments. The presence of inline methods are handled by JavaVirtualFrame under the covers, thus hiding the effect of inlining on the invocation stack from the caller. JavaVirtualFrame provides a Java-compliant solution by always returning correct stack frame information, while still allowing the benefit of inlining of methods. The preferred embodiments thus provide a significant improvement over the prior art, which requires inlining to be disabled in some cases to be fully Java-compliant.

It is conceivable that one could write code to detect at run-time when methods on an invocation stack are inlined, and to manage an invocation stack at run-time to account for inlined methods. The preferred embodiments, however, provide a significant advantage by effectively shifting the overhead of managing the invocation stack from run-time to compile-time. The JavaVirtualFrame class, once compiled, will allow correct stack frame information to always be returned with very little run-time cost.

A virtual stack frame mechanism of the preferred embodiments handles requests to traverse a stack frame, and treats inlined methods as having their own virtual stack frames. If the virtual stack frame mechanism is asked to return the called of a method after skipping three stack frames, the virtual stack frame mechanism determines depth of inlining where needed, and treats each inlined method as having its own virtual stack frame. A virtual stack frame is thus treated the same as a real stack frame, allowing methods to be inlined while always returning correct stack frame information. The identity of stack frame information is thus preserved, even when methods have been inlined.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the forthcoming claims. For example, while the preferred embodiments are described as having practical application to computer programs written in Java, the preferred embodiments are not limited to any particular object oriented language.

What is claimed is:

1. An apparatus comprising:
   at least one processor;
   a memory coupled to the at least one processor;
   an object oriented program residing in the memory and executed by the at least one processor;
   an invocation stack residing in the memory, the invocation stack including a real stack frame that is created as a result of invoking a method in the object oriented program, wherein the real stack frame includes information corresponding to at least one method in the object oriented program that has been inlined into another method; and
   a virtual stack frame mechanism residing in the memory and executed by the at least one processor, the virtual stack frame mechanism returning correct information about the invocation stack for a called method that has corresponding information stored on the invocation stack, wherein the virtual stack frame mechanism comprises an object oriented class that counts both virtual and real stack frames when traversing the invocation stack, wherein each real stack frame may include a plurality of virtual stack frames, and wherein each virtual stack frame corresponds to an inlined method.

2. The apparatus of claim 1 wherein the virtual stack frame mechanism traverses at least one real stack frame in the invocation stack, the virtual stack frame mechanism determining a depth of inlining at a suspend point in the invocation stack frame, the depth of inlining corresponding to a number of virtual stack frames in the real stack frame at the suspend point.

3. The apparatus of claim 2 wherein the virtual stack frame mechanism iteratively traverses a plurality of stack frames in the invocation stack, wherein the plurality of stack frames include at least one real stack frame and may include at least one virtual stack frame, the virtual stack frame mechanism determining depth of inlining at each suspend point of each method corresponding to each of the plurality of stack frames.

4. An apparatus comprising:
   at least one processor;
   a memory coupled to the at least one processor;
   an object oriented program residing in the memory and executed by the at least one processor;
   an invocation stack residing in the memory, the invocation stack including a real stack frame that is created as a result of invoking a method in the object oriented program, wherein the real stack frame includes information corresponding to at least one method in the object oriented program that has been inlined into another method; and
   a virtual stack frame mechanism residing in the memory and executed by the at least one processor, the virtual stack frame mechanism comprising an object oriented class that counts both virtual and real stack frames when traversing the invocation stack, wherein each real stack frame may include a plurality of virtual stack frames, and wherein each of the plurality of virtual stack frames corresponds to an inlined method, wherein the virtual stack frame mechanism iteratively traverses a plurality of stack frames in the invocation stack, wherein the plurality of stack frames includes at least one real stack frame and may include at least one virtual stack frame, the virtual stack frame mechanism determining depth of inlining at each suspend point of each method corresponding to each of the plurality of stack frames, the depth of inlining corresponding to a number of virtual stack frames in the real stack frames at the suspend point.

5. A method for retrieving correct information form an invocation stack when executing an object oriented program, the method comprising the steps of:
   (a) storing information corresponding to a called method on the invocation stack;
   (b) requesting information about the invocation stack;
   (c) traversing the invocation stack, counting both real stack frames on the invocation stack and virtual stack frames that correspond to inlined methods in the object oriented program;
   wherein steps (b) and (c) comprise the step of invoking a method on an object oriented object that counts both virtual and real stack frames when traversing the invocation stack, wherein each real stack frame may include a plurality of virtual stack frames, and wherein each of the plurality of virtual stack frames corresponds to an inlined method; and
   (d) after traversing the invocation stack to a specified level, returning information about the invocation stack.

6. The method of claim 5 further comprising the step of determining a depth of inlining at a suspend point in the invocation stack frame, the depth of inlining corresponding to a number of virtual stack frames in the real stack frame.

7. The method of claim 5 wherein step (c) comprises the step of iteratively traversing a plurality of stack frames in the invocation stack, wherein the plurality of stack frames include at least one real stack frame and may include at least one virtual stack frame, the virtual stack frame mechanism determining depth of inlining at each suspend point of each method corresponding to each of the plurality of stack frames.

8. A method for traversing an invocation stack that is generated while executing an object oriented program, the method comprising the steps of:
   (a) storing information corresponding to a called method on the invocation stack;
   (b) requesting information about the invocation stack, passing a specified number of stack frames to skip; and
   (c) invoking an object oriented class that counts both virtual and real stack frames when traversing the invocation stack, wherein each real stack frame may include a plurality of virtual stack frames, and wherein each of the plurality of virtual stack frames corresponds to an inlined method, counting both real stack frames on the invocation stack and virtual stack frames that correspond to inlined methods in the object oriented program, skipping the specified number of stack frames.

9. The method of claim 8 further comprising the step of:
   (d) returning information from the invocation stack corresponding to a next stack frame that immediately follows the skipped stack frames.

10. A program product comprising:
    a virtual stack frame mechanism that returns correct information from an invocation stack for a called method that has information stored on the invocation stack, the invocation stack including a real stack frame that is created s a result of invoking a method in an object program, wherein the real stack frame includes information corresponding to at least one method in the object oriented program that has been inlined into another method, wherein the virtual stack frame mechanism comprises an object oriented class that counts both virtual and real stack frames when traversing the invocation stack, wherein each real stack frame may include a plurality of virtual stack frames, and wherein each virtual stack frame corresponds to an inlined method; and
    recordable media bearing the virtual stack frame mechanism.

11. The program product of claim 10 wherein the virtual stack frame mechanism traverses at least one real stack frame in the invocation stack, the virtual stack frame mechanism determining a depth of inlining at a suspend point in the invocation stack frame, the depth of inlining corresponding to a number of virtual stack frames in the real stack frame at the suspend point.

12. The program product of claim 11 wherein the virtual stack frame mechanism iteratively traverses a plurality of stack frames in the invocation stack, wherein the plurality of stack frames include at least one stack frame and may include at least one virtual stack frame, the virtual stack frame mechanism determining depth of inlining at each suspend point of each method corresponding to each of the plurality of stack frames.

13. A program product comprising:
    a virtual stack frame mechanism comprising an object oriented class that counts both virtual and real stack frames when traversing the invocation stack, wherein each real stack frame may include a plurality of virtual stack frames, and wherein each of the plurality of virtual stack frames corresponds to an inlined method, wherein the virtual stack frame mechanism traverses at least one real stack frame in the invocation stack, wherein the virtual stack frame mechanism iteratively traverses a plurality of stack frames in the invocation stack, wherein the plurality of stack frames includes at least one real stack frame and may include at least one virtual stack frame, the virtual stack frame mechanism determining depth of inlining at each suspend point of each method corresponding to each of the plurality of stack frames, the depth of inlining corresponding to a number of virtual stack frames in the real stack frames; and
    recordable media bearing the virtual stack frame mechanism.

* * * * *